July 29, 1969  J. D. DOCKERY ET AL  3,458,441

FILTER FOR FLUID

Filed Sept. 12, 1966

INVENTORS
JAMES D. DOCKERY
GEORGE H. SAXTON

BY *Ross M. Campbell*

ATTORNEY

United States Patent Office 3,458,441
Patented July 29, 1969

3,458,441
FILTER FOR FLUID
James D. Dockery, G-4142 Fenton Road, and George H. Saxton, 1206 Pettibone Ave., both of Flint, Mich. 48507
Filed Sept. 12, 1966, Ser. No. 578,824
Int. Cl. B01d 29/08, 29/00
U.S. Cl. 210—416                                1 Claim

ABSTRACT OF THE DISCLOSURE

A fluid filter utilizing diatomaceous earth as a filtering medium. A plastic body having an inlet and an outlet passage therethrough sealably closes the mouth of a hollow container. An impeller rotatably supported within said outlet passage and energized by an electric motor serves as a water pump. A hollow, porous bag is sealably connected at its mouth with said outlet passage upstream of said pump and means is disposed within said bag to prevent collapse thereof. A quantity of diatomaceous earth is contained within said container surrounding said bag. A passage communicates the interior of said container at a point outside said bag with said outlet passage at a point upstream of said pump to permit internal circulation.

---

The present invention relates to means for filtering fluids and more particularly to an improved filter adapted to utilize diatom earth as a filtering medium for fluids.

Diatomite or diatom earth is a siliceous, deep-sea deposit found widely distributed in high latitudes and appearing as a whitish powder consisting essentially of the frustules of diatoms. Sometimes known as kieselguhr, it is resistant to heat and chemical action, and is used in fireproof cements insulating materials, as a backing for more refractory materials for furnace walls, and as an absorbent in the manufacture of explosives. An additional property of diatom earth is its microporosity; the pore space of diatom earth is of the order of one micron, or one millionth of an inch in diameter. Prior to the present invention, however, no means has been known for effectively utilizing the superior fluid filtering capabilities of diatom earth, resulting from its microporosity, as a filtering medium for the breeding, raising, keeping, or medical treatment of fish and other water life in aquariums. This is because diatom earth and other microporous filtering mediums such as powdered activated charcoal have particles so fine that they will pass through conventional retaining materials, such as spun glass, and contaminate the aquarium water. While this may do no harm to mammals, and hence the medium may be used in the filtering systems of swimming pools for humans, the contamination of the water thereby is sufficient to be lethal to tropical fish and other delicate forms of aquatic life which absorb free oxygen directly from the water.

It is accordingly an object of the invention to provide an improved filter for filtering fluids.

Another object is to provide a filter adapted to utilize diatom earth as a filtering medium for fluids.

Still a further object is to provide a self-contained fluid filtering apparatus.

The above and other objects of the invention which will later become apparent as the following description proceeds, are attained by the present invention, preferred embodiments of which have been illustrated, by way of example only, in the accompanying drawing, forming a part of this specification in which like characters are employed to designate like parts throughout the same, and wherein.

Figure 1:
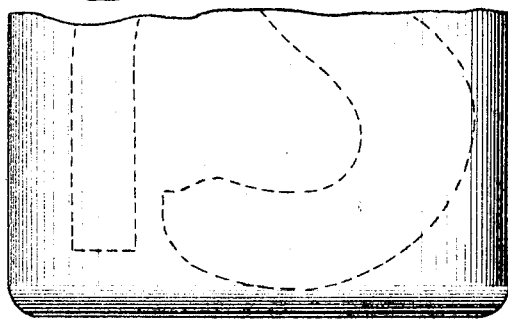
FIGURE 1 is a side sectional view of the preferred embodiment of our invention.

Referring now more particularly to the drawings, we provide in the preferred embodiment of our invention shown in FIGURE 1 a container 10 preferably in the form of a conventional glass Mason jar adapted to be sealed by a conventional annular Mason jar lid 12 and a rubber gasket or seal 14. We also provide a body 16, preferably formed of plastic or other material insoluble in and resistant to corrosion by water, and bearing a circular upper flange 18 and a circular lower flange 20 adapted to be retained by lid 12 against gasket 14 so as to firmly support the body atop container 10 and in water tight relation thereto.

Figure 3:
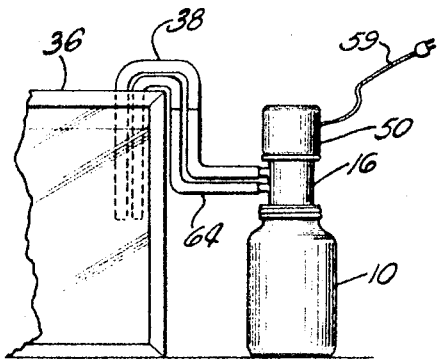
FIGURE 3 is a view showing the preferred embodiment of our invention in use with an aquarium.

Body 16 is provided with a central bore 22, an annular recess 24 therein for a purpose more particularly hereinafter described, a counterbore 26 and an offset counterbore 28. The junction of counterbores 26 and 28 form a seat 30 and an annular flange 32 is provided within counterbore 28 near the seat. A horizontal outlet bore 34 is formed in body 30 to communicate bore 26 with the interior of an aquarium 36 by a piece of conventional plastic tubing 38 which is releasably joined to a lip 40 surrounding the bore. A circular plastic disk 44 is adapted for insertion into counterbore 28 and to be retained tightly against and in substantially watertight relation with seat 30 by flange 32. Disk 44 bears an offset aperture 46 therein and a downwardly-extending sleeve 48 surrounding the aperture, both arranged to be positioned concentrically with counterbore 26 when the disk is seated within counterbore 28. Sleeve 48, aperture 46, bore 26, and bore 34 form an outlet passage for filtered water from the interior of container 10, which filtered water is conducted by tube 38 to the interior of aquarium 36 as best shown in FIGURE 3.

A small electric motor 50 is mounted atop body 16 by engagement of conventional nut and bolt combinations 52 with flange 18. The shaft 54 of motor 50 extends downwardly through bore 22 and through an annular, watertight seal 56 retained within recess 24, and supports an impeller 57 rotatably within bore 26. Impeller 57 and bore 26 thus form a small water pump generally indicated at 58. Appropriate electrical connection 59 is provided to energize motor 50 and thus cause rotation of shaft 54 and impeller 26, to draw filtered fluid upwardly from the interior of container 10, through sleeve 48 and aperture 46 into counterbore 26, and outwardly through outlet bore 34 and tube 38 to aquarium 36.

An L-shaped inlet bore 60 surrounded by a lip 62 is also provided in body 16 and communicates the interior of container 10 near one side thereof with the interior of aquarium 36 by an inlet tube 64 formed from another piece of conventional plastic tubing engaged with the lip. When the pressure within container 10 is reduced by action of the pump, unfiltered water from aquarium 36 will be drawn therefrom through tubing 64 and inlet bore 62 and into the container. If desired, an additional piece of plastic tubing 68 may be provided and connected to inlet bore 62 by a sleeve 70 on the underside of body 16 so as to dirct water from the bore to the bottom of container 10.

An elongated bag 72 formed of fine mesh material such as nylon or the like is provided and adapted to be secured at the bottom of sleeve 48 by a spring clip 74. Means such as a plastic spiral 76 or the like is provided within bag 72 to prevent collapse of the bag. Sufficient diatom earth 78 is then placed in container 10 to coat the outside of bag 72 with earth to an approximate thickness of one-eighth of an inch. Bag 72 is selected to have a mesh of sufficiently small count to prevent the passage of substantially all of the diatom earth therethrough and into the interior of the bag, but sufficiently large to permit the passage of water therethrough. A small passage 80 is provided in disc 44 near the outer perimeter thereof and near the sidewall of bore 26 where, when pump 58 is in operation, the water pressure is substantially higher than within sleeve 48.

In operation, with the device thus assembled, the interior of container 10, body 16, and tubes 38 and 64 are completely filled with water by siphoning or other convenient means. Outlet tube 38 is then clamped or otherwise closed and motor 50 energized. As pump 58 begins to operate, it draws water from the diatom earth surrounding bag 72, through the mesh of the bag to the interior thereof, and upwardly through sleeve 48 into bore 26. Since hose 38 is closed, the water, under pressure from impeller 57, passes downwardly through passage 80 back into the interior of container 10 and continues to circulate in the same manner. As the water within container 10 outside of bag 72 passes through the mesh of the bag, the diatom earth 78 is deposited on the outer surface of the bag. Those finer particles of diatom earth 78 which initially pass through the mesh of the bag are carried upwardly with the water through tube 48 into counterbore 26 and return through passage 80 to the interior of container 10 where they are subsequently trapped by the coarser particles of the diatom earth previously deposited on the exterior of the bag. After a very few cycles all of the fine particles of the diatom earth are thus trapped on the outer surface of the bag, and the water passing through the mesh of the bag and passing upwardly through sleeve 48 into bore 26 is in a highly filtered condition due to the high filtration properties of the diatom earth. Outlet tube 38 is then unclamped and the water within counterbore 26 is permitted to pass through the tube and into aquarium 36. Unfiltered water of an equal quantity is then automatically siphoned from aquarium 36 through inlet tube 64, bore 62, and tube 68 into container 10, and the filtering process thus continues. While aperture 80 remains open at all times, it is of such a small area compared to that of outlet bore 34 that only an inconsequential amount of water will pass from counterbore 26 through the passage and back into the interior of container 10 when outlet tube 38 is not clamped shut.

Our improved filter thus permits diatom earth to be used for the first time in aquaria without contaminating the water therein with a concentration of minute particles of diatom earth of a concentration lethal to tropical fish and other marine life, while retaining the superior filtration characteristics of the earth. Since diatom earth will filter out particles as small as the order of one millionth of an inch, it filters out free-swimming, disease-causing organisms, such as the protozoa Ichthyophthrisius, which is the causative organism of the disease known as "ich" and which, in its newly hatched stage, has a diameter of approximately 7 microns or 7 millionths of an inch. Experiments have shown that our improved filter is of such high degree of effectiveness that it will not only prevent the growth of such disease-causing organisms and will thus preserve the health of the marine life in an aquarium but, by removing such organisms to the filter media when they are in a stage of development wherein they do not inhabit the body of a fish, our filter will actually promote the cure of such diseases of fish. Careful experiments have demonstrated that fish afflicted with "ich" may thus be successfully treated without the use of conventional chemical preparations and further, that with our filter healthy fish may be left in the same aquarium with diseased fish without being infected by the diseased fish, due to the rapid removal of the disease-causing organisms while in an infectious stage. The remarkable effectiveness of our invention will thus be obvious to anyone even remotely acquainted with the difficulty of curing and preventing the spread of these diseases within an aquarium.

The use of diatom earth permitted by our invention further results in the reduction of rust and hardness in the aquarium water system with no appreciable adverse affect upon pH. If desired, the high filtration property of our invention permits the addition of powdered activated charcoal to the filtering medium in order to bleach the aquarium water and remove gases dissolved therein.

When after considerable use the outer surface of the diatom earth within container 10 has become saturated with impurities removed from the aquarium and the efficiency of the filter has become reduced, the underlying unsaturated portion of the diatom earth may be brought to the surface by simply shutting off motor 50 and shaking container 10, or by disconnecting the filter from the aquarium and backflushing by forcing fluid through the device in a reverse direction, i.e. inwardly through outlet tube 38. The device is then reconnected and the recirculating procedure hereinabove described is again undertaken, following which the filter may again be employed in the usual manner. When all of the diatom earth has become saturated with contaminated material from the aquarium, the diatom earth may be removed, discarded, and replaced with fresh diatom earth. Removal of contaminated diatom earth from container 10 may be accomplished either by backflushing, whereby the device is disconnected from aquarium 36 and the diatom earth is flushed out of container 10 through inlet bore 62, or by simply unscrewing cap 12, dumping out the contaminated diatom earth, and rinsing out container 10 and the outside of bag 72. A new supply of diatom earth is then added to container 10 and the device is reassembled.

Figure 4:
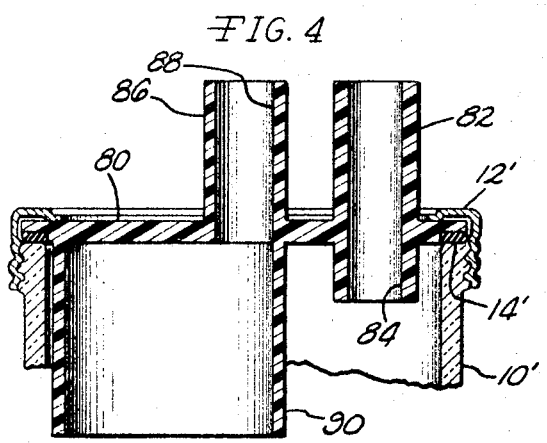
FIGURE 4 is a side sectional view of a portion of a modified form of our invention.
Figure 2:
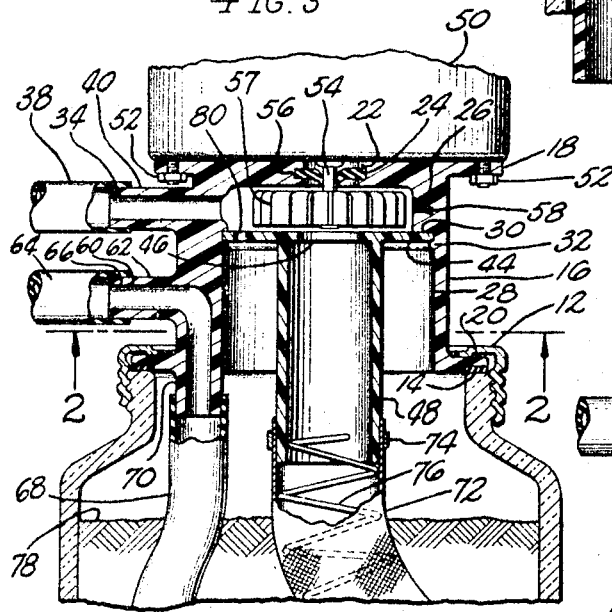
FIGURE 2 is a view taken along the line 2—2 of FIGURE 1.
Figure 2:
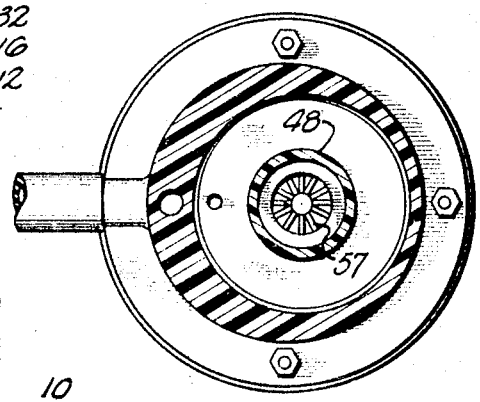

We also provide a modified form of our invention adapted for use with a separate pump and best shown in FIGURE 4. In this form of our invention a relatively thin cover 80 is provided in lieu of body 16 and is adapted to be secured tightly against the top of a container 10' by a conventional annular Mason jar lid 12' and gasket 14' in the same manner as in the preferred form of the invention. An upstanding sleeve 82 having an inlet bore 84 therein is supported upon cover 80 and is adapted to support inlet tube 64 leading from aquarium 36. An upstanding outlet sleeve 86 having an outlet bore 88 therein is provided in cover 80, and a downwardly extending sleeve 90 is supported upon the underside of cover 80 surrounding and communicating with outlet bore 88. Sleeve 90 is adapted to support bag 72 thereon in the same manner as in the preferred form of the invention. Outlet tube 38 connects outlet sleeve 86 to a remote, conventional water pump (not shown) and conducts filtered water thereto from container 10'. In this form of our invention bag 70 (not shown) is connected to sleeve 90, contains means such as plastic spiral 76 (not shown) for preventing collapse of the bag, and a supply of diatom earth surrounds the bag within the container, in the same manner as in the preferred form of our invention.

In operation, contaminated water is drawn from container 10, through the diatom earth and bag within the container, and through sleeve 90 and tube 38. The negative pressure within container 10' draws water from aquarium 36 through inlet tube 64, and bore 84 in sleeve 82 into the interior of container 10', where it passes through the diatom earth bag 72, upwardly through the interior of the bag and sleeves 90 and 88, and through outlet hose 38 to the pump in a filtered condition and thence by another tube (not shown) back to the aquarium.

Figure 5:
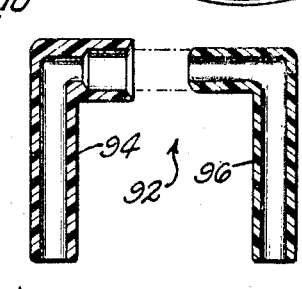
FIGURE 5 is an exploded view of improved hose terminus means for use with our invention.

To facilitate the passage of water into and from the aquarium, and to support the hose assembly, we also provide a new and novel U-shaped conduit generally shown at 92 comprised of two tightly mating elbow sections 94 and 96, formed of plastic or similar material and best shown in FIGURE 5. To assemble conduit 92, male elbow 96 is inserted tightly into female elbow 94, wherein it is retained by friction. If desired, the joint between elbows 94 and 96 may be cemented with a conventional cement not harmful to aquatic life. Conduit 92 may then be hung over the edge of aquarium 36, as shown in FIGURE 3, and the conduit connected to plastic tubing in the usual manner. If desired, inlet sleeve 82 of the modified form of our invention may be secured directly to conduit 92, by selecting sleeve 82 to have an appropriate diameter or by a short length of plastic tubing connected to and suspended from the conduit.

It is to be understood that the forms of the invention herewith shown and described are to be taken as preferred embodiments of the same and that resort may be had to various changes in construction without departing from the scope of the subjoined claim.

What is claimed is:
1. A fluid filter comprising,
a container having a mouth,
a body adapted for sealable connection to the mouth of said container,
an inlet passage extending through said body and communicating with the interior of said container,
an outlet passage through said body and communicating with the interior of said container,
a fluid pump within said outlet passage arranged to draw fluid from said container and to force same outwardly from said body through said outlet passage,
an electric motor mounted upon said body and operatively connected with said pump to energize same,
a hollow, porous bag having a mouth and disposed within said container,
means disposed within said bag for preventing collapse thereof,
means for sealably communicating the mouth of said bed with said outlet passage upstream of said pump,
a passage communicating the interior of said container at a point outside said bag with said outlet passage at a point upstream of said pump,
and diatomaceous earth disposed within said container outside of said bag.

References Cited
UNITED STATES PATENTS

| 2,083,005 | 6/1937 | Czarnecki | 210—323 |
| 3,178,024 | 4/1965 | Jacuzzi | 210—288 X |
| 3,273,717 | 9/1966 | Canterbury | 210—443 X |
| 3,289,847 | 12/1966 | Rothemund | 210—266 |
| 3,308,957 | 3/1967 | Klein | 210—288 X |

SAMIH N. ZAHARNA, Primary Examiner

U.S. Cl. X.R.
210—444